(12) United States Patent
Pantalone et al.

(10) Patent No.: US 10,946,953 B2
(45) Date of Patent: Mar. 16, 2021

(54) MULTI-ROTOR TONAL NOISE CONTROL FOR UAV

(71) Applicant: Wing Aviation LLC, Mountain View, CA (US)

(72) Inventors: Giulia Pantalone, San Francisco, CA (US); Adam Woodworth, San Jose, CA (US); Eric Teller, Palo Alto, CA (US); Ealgoo Kim, Cupertino, CA (US); Jacob Huffman, Cupertino, CA (US); Martin Kubie, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 448 days.

(21) Appl. No.: 15/849,365

(22) Filed: Dec. 20, 2017

(65) Prior Publication Data

US 2019/0185149 A1    Jun. 20, 2019

(51) Int. Cl.
*B64C 27/00* (2006.01)
*B64C 39/02* (2006.01)
*B64C 27/14* (2006.01)
*B64D 31/00* (2006.01)
*G10K 11/178* (2006.01)
(Continued)

(52) U.S. Cl.
CPC ............ *B64C 27/001* (2013.01); *B64C 27/14* (2013.01); *B64C 39/024* (2013.01); *B64D 31/00* (2013.01); *B64D 31/06* (2013.01); *B64D 31/12* (2013.01); *G05D 19/02* (2013.01); *G10K 11/1785* (2018.01); *H02P 5/46* (2013.01); *B64C 2201/021* (2013.01); *B64C 2201/027* (2013.01); *B64C 2201/042* (2013.01); *B64C 2201/104* (2013.01); *B64C 2201/108* (2013.01); *B64C 2201/141* (2013.01); *B64C 2201/146* (2013.01); *B64C 2220/00* (2013.01); *G10K 2210/121* (2013.01); *G10K 2210/1281* (2013.01); *G10K 2210/3044* (2013.01)

(58) Field of Classification Search
CPC ..... B64C 27/001; B64C 27/14; B64C 39/024; G10K 11/1785; B64D 31/00; B64D 31/06; B64D 31/12
USPC ........................................................... 701/3
See application file for complete search history.

(56) References Cited

U.S. PATENT DOCUMENTS 8,515,656 B2 * 8/2013 Reed ................... B64D 9/00
                                                     701/124
9,415,870 B1 * 8/2016 Beckman ............ B64C 39/024
(Continued)

OTHER PUBLICATIONS

Popper, Ben, "DJI's New Drone is Unbelievably Quiet", The Verge, Nov. 1, 2017, 6 pages.
(Continued)

*Primary Examiner* — Peter D Nolan
*Assistant Examiner* — Wae L Louie
(74) *Attorney, Agent, or Firm* — Christensen O'Connor Johnson Kindness PLLC

(57) ABSTRACT

A technique of controlling tonal noises produced by an unmanned aerial vehicle (UAV) includes generating thrust with a plurality of rotor units mounted to the UAV to propel the UAV into flight. Each of the rotor units includes a bladed rotor. A rotation rate or a phase delay of at least one of the rotor units is adjusted relative to another of the rotor units. The adjustment causes a spread in the tonal noises generated by the rotor units.

24 Claims, 10 Drawing Sheets

(51) Int. Cl.
  *G05D 19/02*   (2006.01)
  *B64D 31/06*   (2006.01)
  *B64D 31/12*   (2006.01)
  *H02P 5/46*    (2006.01)

(56) References Cited

U.S. PATENT DOCUMENTS

| | | | | |
|---|---|---|---|---|
| 9,442,496 | B1* | 9/2016 | Beckman | G10K 11/17873 |
| 9,489,937 | B1 | 11/2016 | Beard et al. | |
| 9,646,597 | B1* | 5/2017 | Beckman | G10K 11/1783 |
| 9,802,702 | B1* | 10/2017 | Beckman | B64C 39/024 |
| 2013/0317667 | A1* | 11/2013 | Kruglick | G06T 17/10 |
| | | | | 701/2 |
| 2016/0025551 | A1* | 1/2016 | Lee | G01H 3/00 |
| | | | | 701/532 |
| 2016/0083073 | A1* | 3/2016 | Beckman | G10K 11/17857 |
| | | | | 40/463 |
| 2017/0274981 | A1* | 9/2017 | Shiosaki | B64C 11/32 |
| 2018/0098052 | A1* | 4/2018 | Black | G06T 17/00 |
| 2018/0186448 | A1* | 7/2018 | Pantalone | B64C 39/024 |
| 2019/0185149 | A1* | 6/2019 | Pantalone | G10K 11/1785 |
| 2019/0189016 | A1* | 6/2019 | Kubie | B64C 39/024 |
| 2019/0237059 | A1* | 8/2019 | Cantrell | G10K 11/175 |

OTHER PUBLICATIONS

International Search Report and Written Opinion from the International Searching Authority dated Mar. 22, 2019 for International Application No. PCT/US2018/065029, filed Dec. 11, 2018, 11 pages.

Australian Office Action, dated Nov. 10, 2020, in corresponding Australian Patent Application No. 2018388449, 4 pages.

* cited by examiner

MULTI-ROTOR TONAL NOISE CONTROL FOR UAV

TECHNICAL FIELD

This disclosure relates generally to unmanned aerial vehicles (UAVs), and in particular, relates to noise control of UAVs.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) are becoming more popular in general. Their use over populated areas, such as suburban and urban localities, means that controlling the noise generated by these vehicles is increasingly important.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation of an unmanned aerial vehicle (UAV) for controlling tonal noise output from the rotor units of the UAV are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As UAV become more common in the skies over populated environments, controlling the tonal noises that emanate from their rotor units (also referred to as multi-rotor tonal noise) is becoming increasingly important. Multi-rotor tonal noise can be perceived as a nuisance to bystanders, particularly when regularly subjected to this noise. The perceived annoyance of multi-rotor tonal noise can be abated by spreading out the tonal noises. This spreading can be achieved spectrally by spreading component frequencies generated by the rotor units of a UAV, can be achieved temporally by offsetting phases of peak amplitudes of the tonal noises, or can be done using a combination of these two spreading techniques. Additional techniques that spread out tonal noises to reduce the perceived nuisance of multi-rotor tonal noise, and in some cases even generate pleasant sounds, include generating chords, melodies, or beat frequencies from the tonal noises generated by the rotor units of a UAV.

Embodiments described herein include a UAV, which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1:
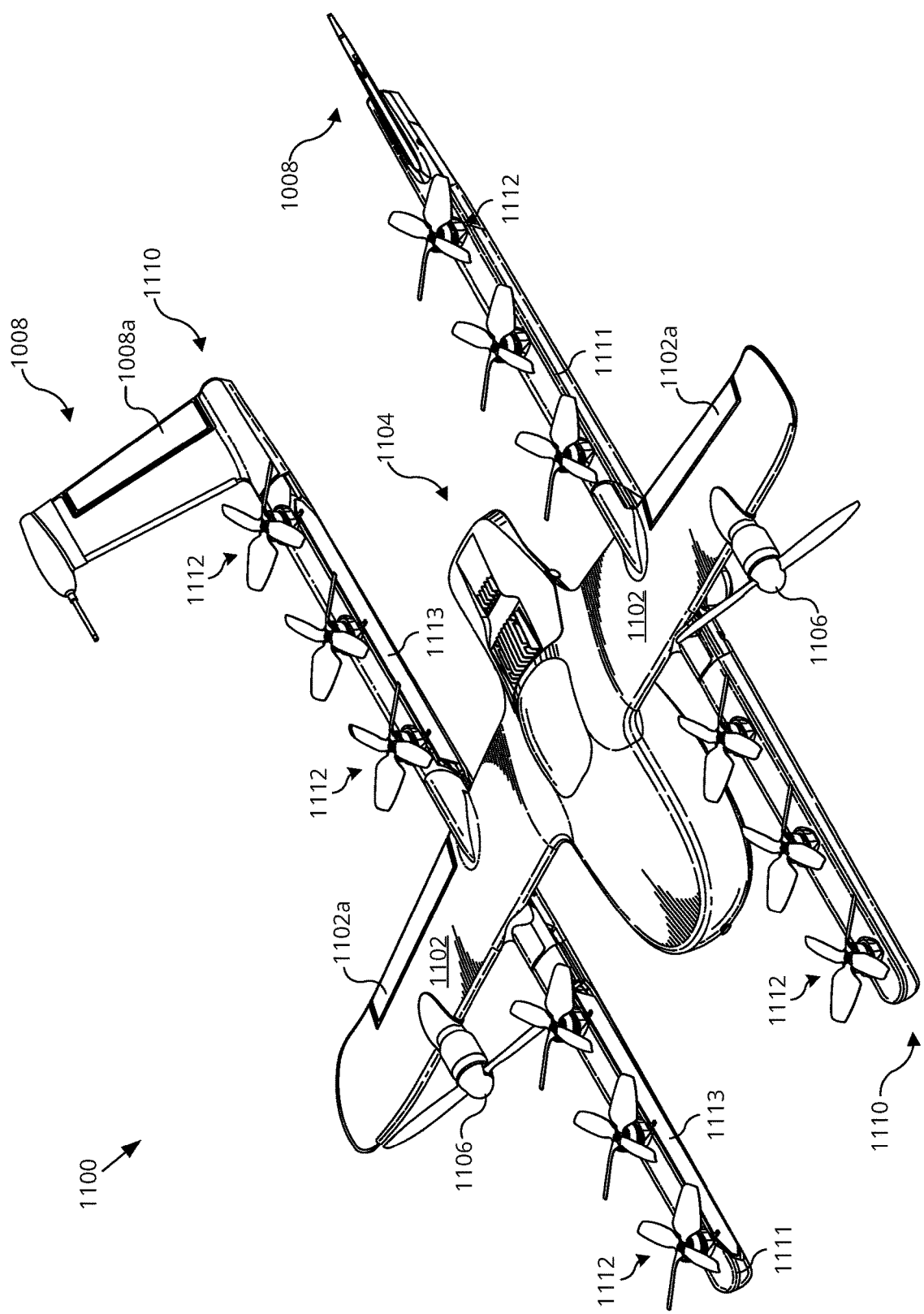
FIG. 1 is a perspective view illustration of an unmanned aerial vehicle (UAV), in accordance with an embodiment of the disclosure.

FIG. 1 is a perspective view illustration of a UAV 1100, according to an embodiment of the disclosure. The illustrated embodiment of UAV 1100 is a fixed-wing UAV, which may also be referred to as an airplane, an aeroplane, a glider, or a plane, among other possibilities. The fixed-wing UAV 1100, as the name implies, has a wing assembly 1102 that generates lift based on the wing shape and the vehicle's forward airspeed. For instance, wing assembly 1102 may have an airfoil-shaped cross section to produce an aerodynamic lift force on the UAV 1100. Although UAV 1100 is illustrated as a fixed-wing UAV, it should be appreciated that the multi-rotor noise control techniques described herein are also applicable to other types of multi-rotor UAVs as described above.

The illustrated embodiment of UAV 1100 includes a fuselage 1104. In one embodiment, fuselage 1104 is modular and includes a battery module, an avionics module, a mission payload module, and a fuselage cover. These modules are detachable from each other and mechanically securable to each other to contiguously form at least a portion of the fuselage or UAV main body.

The battery module may house one or more batteries for powering UAV 1100. The avionics module houses flight control circuitry of UAV 1100, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of UAV 1100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.). Of course, the mission payload module may provide mixed use payload capacity (e.g., additional battery and camera equipment) for a variety of mix-use missions.

The illustrated embodiment of UAV 1100 further includes forward propulsion units 1106 (also referred to as rotor units) positioned on wing assembly 1102, which can each include a motor, shaft, and propeller, for propelling UAV 1100. The illustrated embodiment of UAV 1100 further includes two boom assemblies 1110 that secure to wing assembly 1102. In one embodiment, wing assembly 1102 includes a wing spar disposed within a wing foil.

The illustrated embodiments of boom assemblies 1110 each include a boom housing 1111 in which a boom carrier (not illustrated) is disposed, vertical propulsion units 1112, printed circuit boards 1113, and stabilizers 1108. Boom carriers are structural members (e.g., tubular rods) that provide the main structural support to which the wing spar and vertical propulsion units 1112 are mounted. Vertical propulsion units 1112 (also referred to as rotor units) can each include a motor, shaft, and propeller, for providing vertical propulsion. Vertical propulsion units 1112 may be used during a hover mode where UAV 1100 is descending (e.g., to a delivery location) or ascending (e.g., following a delivery). Stabilizers 1108 (or fins) may be included with UAV 1100 to stabilize the UAV's yaw (left or right turns) during flight. In some embodiments, UAV 1100 may be configured to function as a glider. To do so, UAV 1100 may power off its propulsion units and glide for a period of time.

During flight, UAV 1100 may control the direction and/or speed of its movement by controlling its pitch, roll, yaw, and/or altitude. For example, the stabilizers 1108 may include one or more rudders 1108a for controlling the UAV's yaw, and wing assembly 1102 may include elevators for controlling the UAV's pitch and/or ailerons 1102a for controlling the UAV's roll. As another example, increasing or decreasing the speed of all the propellers simultaneously can result in UAV 1100 increasing or decreasing its altitude, respectively.

Many variations on the illustrated fixed-wing UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates one wing assembly 1102, two boom assemblies 1110, two forward propulsion units 1106, and six vertical propulsion units 1112 per boom assembly 1110, it should be appreciated that other variants of UAV 1100 may be implemented with more or less of these components. For example, UAV 1100 may include two wing assemblies 1102, four boom assemblies 1110, and more or less propulsion units (forward or vertical).

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2A:
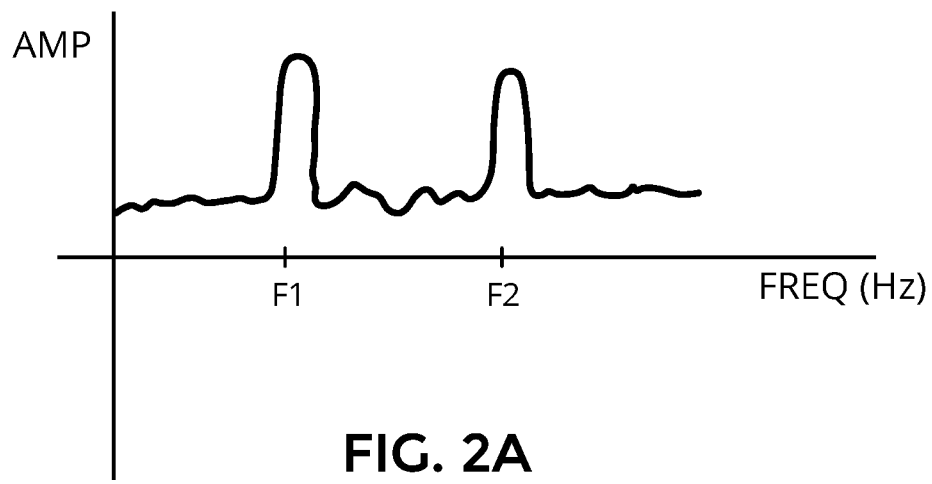
FIG. 2A is a chart illustrating example tonal noise from rotor units of a UAV that is spectrally concentrated.
Figure 2B:
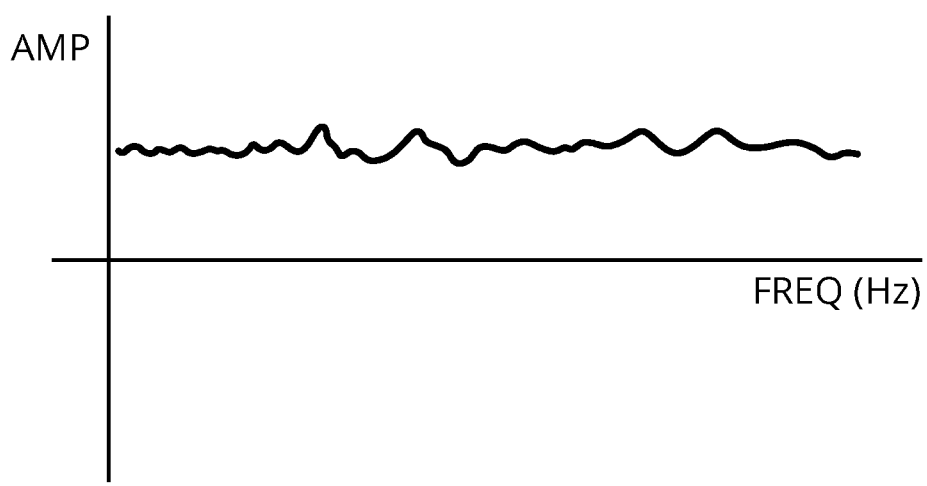
FIG. 2B is a chart illustrating example tonal noise from rotor units of a UAV that is spectrally spread out or dispersed, in accordance with an embodiment of the disclosure.

As mentioned above, the perceived annoyance of multi-rotor tonal noise can be abated by spreading out the tonal noises. FIG. 2A is a chart illustrating example tonal noise from rotor units of a UAV that is spectrally concentrated about two frequencies F1 and F2. Spectrally distinctive or spectrally concentrated tonal noises are often perceived as a greater nuisance relative to spectrally dispersed noise (e.g., such as white noise, pink noise, pseudo-random noise, etc.). By spectrally spreading out multi-rotor tonal noises (e.g., as illustrated in FIG. 2B), the perceived annoyance of the multi-rotor tonal noises can be reduced, in accordance with embodiments described herein.

Figure 2C:
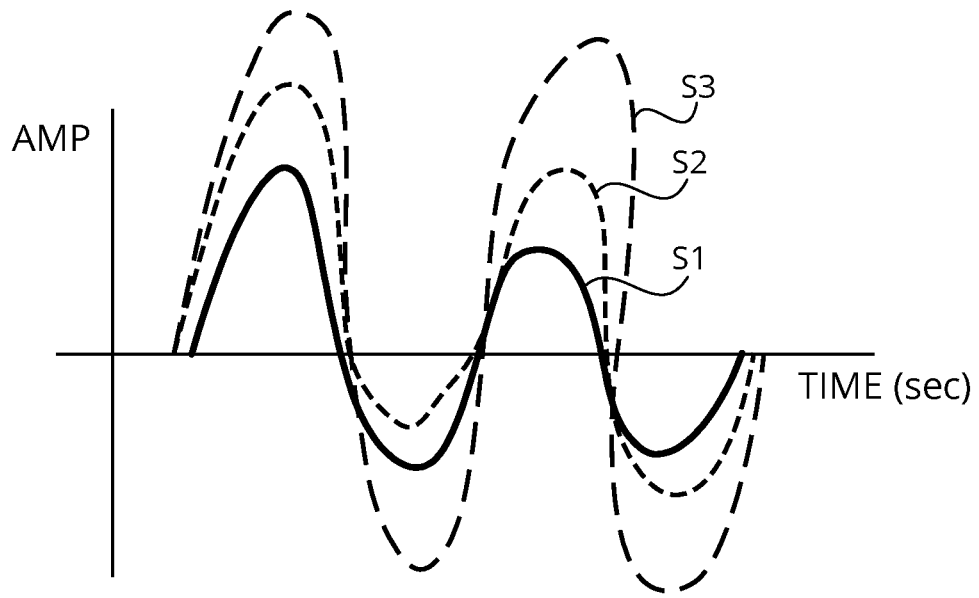
FIG. 2C is a chart illustrating example tonal noise from rotor units of a UAV that is phase aligned.
Figure 2D:
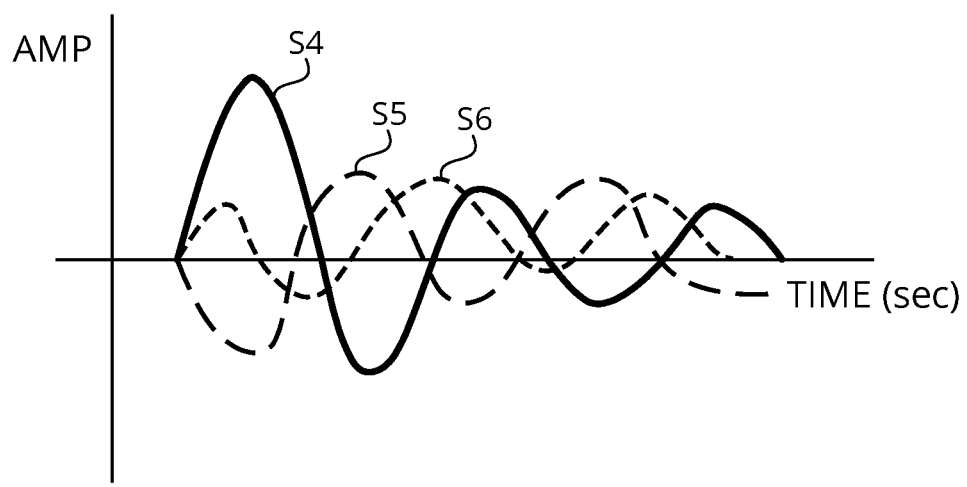
FIG. 2D is a chart illustrating example tonal noise from rotor units of a UAV that is phase dispersed, in accordance with an embodiment of the disclosure.

Another form of concentrated or distinctive multi-rotor tonal noise is phase aligned tonal noise (also referred to as temporally aligned tonal noise), as illustrated in FIG. 2C. With phase aligned multi-rotor tonal noise, the constituent tonal noises S1, S2, S3 from the various rotor units constructively interfere generating high amplitude, pulsating noises. Again, these phase aligned tonal noises are typically perceived as being a greater nuisance than phase offset (or temporally dispersed) multi-rotor tonal noise. For example, FIG. 2D illustrates constituent tonal noises S4, S5, and S6 generated by various rotor units of a UAV that are offset in phase relative to each other. The phase dispersed tonal noises illustrated in FIG. 2D are more evenly dispersed in time and generate less peaky or pulsating noise relative to the phased aligned tonal noise illustrated in FIG. 2C. Accordingly, the multi-rotor tonal noises can be spread spectrally (dispersing frequency components), can be spread temporally (offsetting phase delays), or a combination of both to reduce perceived audible annoyance.

Figure 3:
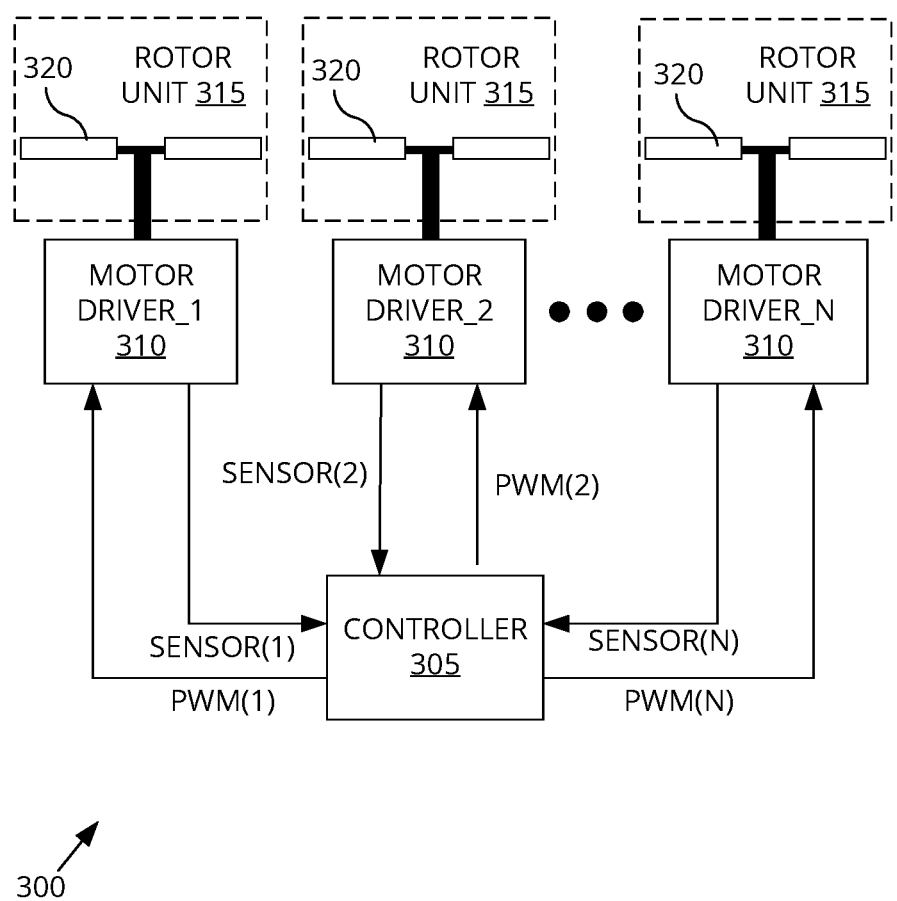
FIG. 3 is a functional block diagram illustrating a control system for modulating phases and/or rotation rates of rotor units of a UAV, in accordance with an embodiment of the disclosure.

FIG. 3 is a functional block diagram illustrating a control system 300 for modulating phases and/or rotation rates of rotor units of UAV 1100, in accordance with an embodiment of the disclosure. The illustrated embodiment of control system 300 includes a controller 305 and motor drivers 310. Motor drivers 310 drive rotor units 315, which include a motor, a shaft, and a bladed rotor 320. Bladed rotors 320 may be mounted in a vertical orientation to generate vertical thrust (e.g., vertical rotor units) or a horizontal orientation to generate horizontal thrust (e.g., horizontal rotor units).

Controller 305 operates to choreograph the operation of rotor units 315 to control their rotation speed and relative phase delays. Controller 305 may be implemented as a general purpose processor or microcontroller executing software/firmware logic (e.g., instructions) or a hardware controller executing hardware logic (e.g., application specific integrated circuit, field programmable gate array, etc.). In the illustrated embodiment, controller 305 outputs pulse width modulated (PWM) control signals to motor drivers 310. The duty cycle, frequency, and/or phase of the PWM control signals can be modulated to control the rotation rates and phase delays of rotor units 315. Motor drivers 310 receive the PWM control signals and generate the drive current/voltage for driving the motors of rotor units 315. In one embodiment, motor drivers 310 modulate battery power based upon the PWM control signals to drive the motors of rotor units 315.

In one embodiment, feedback sensor signals are provided to controller 305. In one embodiment, the feedback sensor signals are based upon real-time monitoring of the voltage and/or current that is driving each rotor unit 315. In one embodiment, the feedback sensor signals are based upon an encoder that provides actual rotation speed (e.g., rotational frequency or rotational period) or actual rotational position (e.g., rotational phase). Controller 305 may use the feedback signals to adjust the PWM control signals in real-time to achieve a desired rotation rate or phase delay of each rotor unit 315 or groups of rotor units 315. Of course, other control system architectures may be implemented. Similarly, other feedback sensor system may be provided to monitor rotational rate and/or phase in real-time (e.g., audio sensor, optical sensor, etc.).

The rotation rate or rotational frequency of each rotor unit 315 directly correlates to the spectral content of the tonal noises generated by each rotor unit 315. Accordingly, by independently adjusting the rotation rate of a given rotor unit 315 the component frequencies of the tonal noise generated by that rotor unit 315 can be independently controlled. By collectively varying the rotation rates of rotor units 315 relative to each other, the collective component frequencies generated by UAV 1100 can be spectrally spread out to reduce the perceived nuisance of the tonal noises. Similarly, rotational phase of each rotor unit 315 directly correlates to the temporal position of the peak amplitude of the tonal noises generated by each rotor unit 315. By offsetting the phase delays applied to each rotor unit 315 (or groups of rotor units 315), the peak amplitudes of the tonal noises are offset relative to each other thereby also reducing the perceived nuisance of the tonal noises collectively output from UAV 1100.

One technique for spectrally spreading out component frequencies of tonal noise is to vary the physical geometries of bladed rotors 320. Changing the physical geometries of bladed rotors 320 enables different rotation rates of rotor units 315 to achieve a similar or same thrust. Accordingly, changing the physical geometries of bladed rotors relative to each other (or in groups relative to each other) enables constant thrust for stable flight while varying the component frequencies output from one rotor unit 315 to the next. This serves to spectrally spread out the component frequencies of the tonal noises collectively generated by the rotor units of UAV 1100.

Figure 4A:
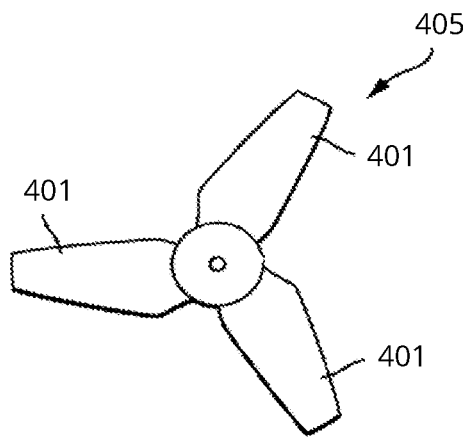
FIGS. 4A-E are illustrations of different physical geometries of bladed rotors, which may be used to spectrally spread out component frequencies of tonal noise, in accordance with an embodiment of the disclosure.
Figure 4B:
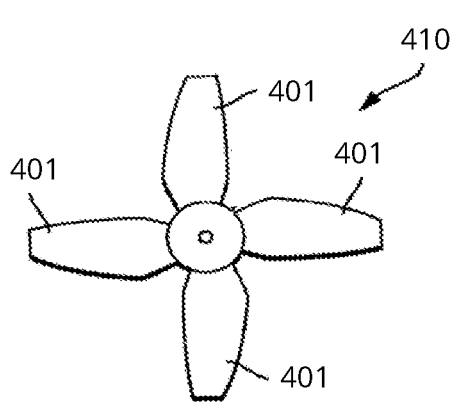
Figure 4C:
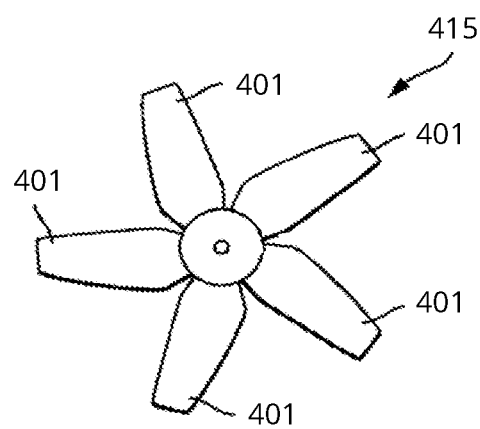
Figure 4D:
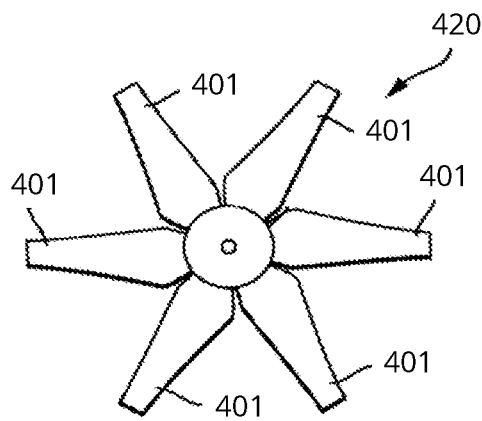
Figure 4E:
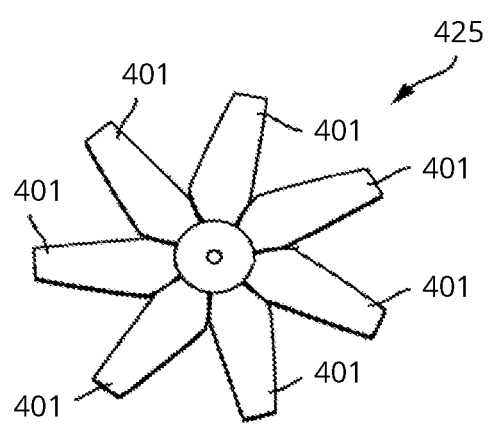

Varying the physical geometries between the rotor units of UAV 1100 may include varying one or more of a diameter of bladed rotors 320, a surface area of bladed rotors 320, a pitch of bladed rotors 320, or a number of blades on a bladed rotor 320. For example, as illustrated in FIG. 4A, UAV 1100 may include one or more bladed rotors 405 having three blades 401, may include one or more bladed rotors 410 having four blades 401 (e.g., see FIG. 4B), may include one or more bladed rotors 415 having five blades 401 (e.g., see FIG. 4C), may include one or more bladed rotors 420 having six blades 401 (e.g., see FIG. 4D), may include one or more bladed rotors 415 having seven blades 401 (e.g., see FIG. 4E), etc. In one embodiment, each rotor unit of UAV 1100 may have a different physical geometry to achieve variable rotation rates for a given thrust. In yet other embodiments, the rotation rates of the rotor units may be varied in groups.

Figure 5:
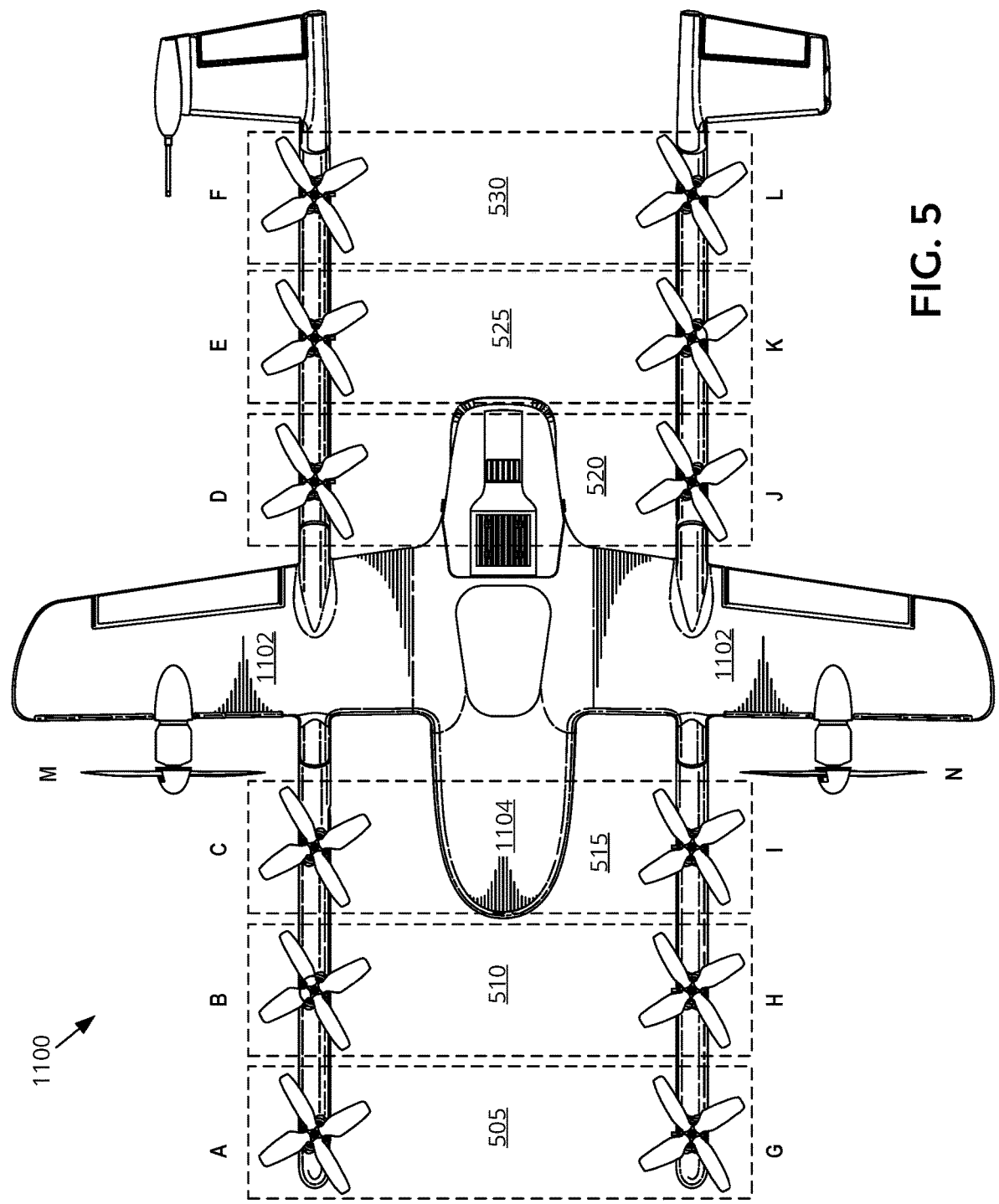
FIG. 5 is a plan view illustration of a UAV depicting how rotor units may be logically grouped and their rotation rates varied in groups to spectrally spread out the component frequencies of tonal noise, in accordance with an embodiment of the disclosure.

FIG. 5 is a plan view illustration of UAV 1100 depicting how rotor units A-M may be logically grouped and their rotation rates varied in groups to spectrally spread out the component frequencies of tonal noise, in accordance with an embodiment of the disclosure. For example, FIG. 5 illustrates the vertical lift rotor units A-L logically organized into six groups 505-530 with each group including two rotor units. Because rotor units A-L are paired in a symmetrical manner, their rotation rates can be varied on a group-wise basis. For example, groups 505 and 530 may be assigned a common rotation rate R1, while groups 510 and 525 may be assigned a common rotation rate R2, and groups 515 and 520 may be assigned yet another common rotation rate R3, where R1, R2, and R3 are different rotation rates that generate different, spectrally spaced tonal noises. Additionally, the geometries of the bladed rotors may also be varied within a group to provide further rotational rate diversity, while achieving common thrust output from rotor units within a given group. In one embodiment, forward thrust rotor units M and N may form another logical group that is independently varied.

Figure 6:
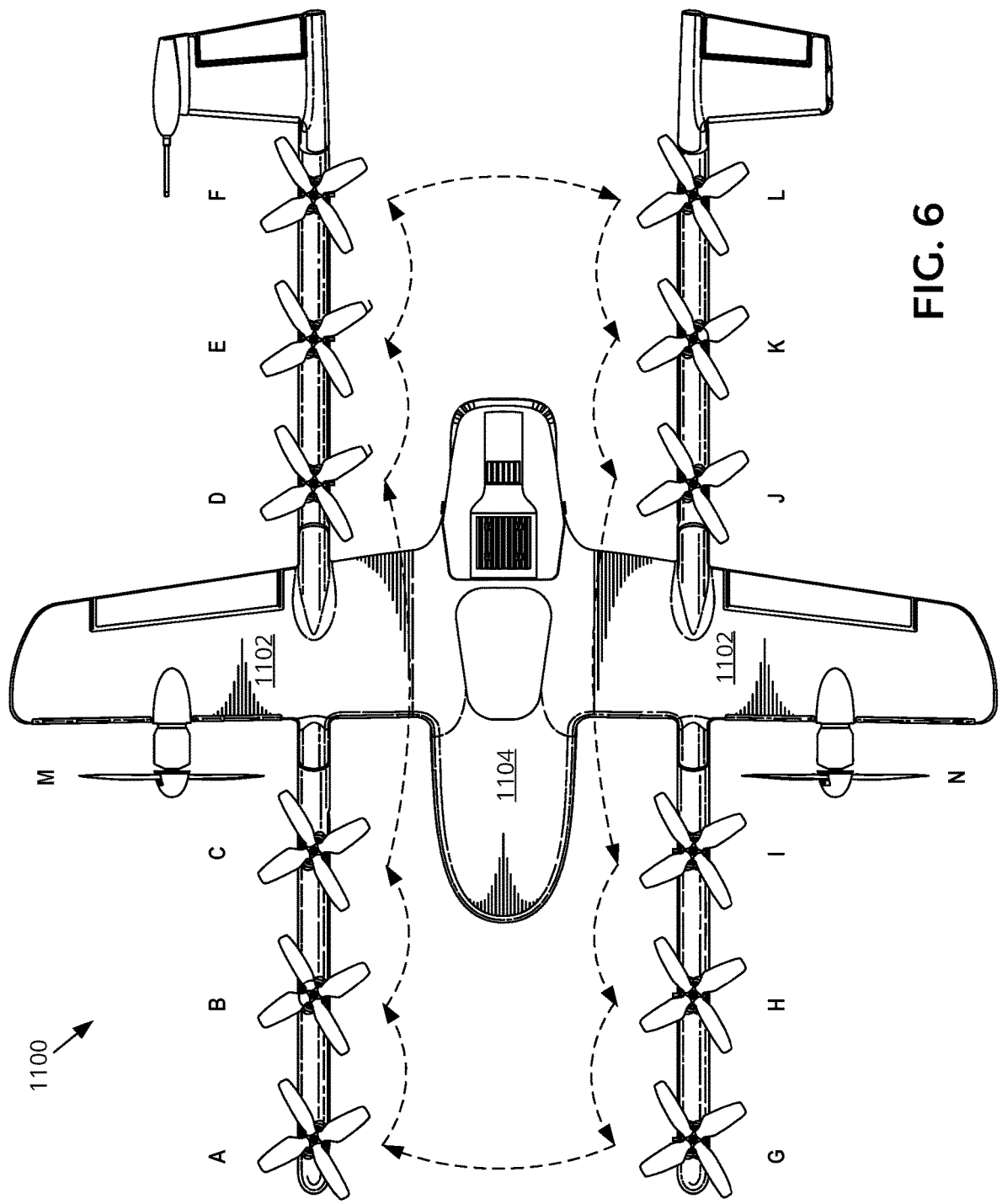
FIG. 6 is a plan view illustration of a UAV depicting how the rotation rates of rotor units may be dynamically modulated in a sequential pattern to spectrally spread out component frequencies of tonal noise, in accordance with an embodiment of the disclosure.

FIG. 6 is a plan view illustration of UAV 1100 depicting yet another technique for varying rotation rates of vertical lift rotor units A-L to spectrally spread out the component frequencies of the tonal noises. In FIG. 6, the rotation rates of rotor units A-L are dynamically modulated in a sequential pattern or circuit (e.g., AB C D E F L K-J-I-H-G and repeat). For example, each rotor unit may rotate at different rotation rate from the other rotor units, but hand off its current rotation rate to the next rotor unit in the circuit and receive a new rotation rate from a previous rotor unit in the circuit. The rotation rate exchange may then cycle through the circuit (e.g., AB C D E F L K J-I-H-G and repeat). Of course, other circuit paths and dynamic modulation schemes may be implemented. In some embodiments, this sequential pattern of dynamic modulation may introduce a gyroscopic wobble about a stabilized center of UAV 1100. In other embodiments, the rotation rates may be sequentially modulated in geometrically opposing pairs or groups of rotor units to reduce or offset any gyroscopic wobble.

As mentioned above, in addition (or alternatively) to varying the relative rotation rates of rotor units of UAV 1100 to spectrally spread out component frequencies, the tonal noises generated by UAV 1100 may also be spread out by introducing phase delays between the rotor units. In one embodiment, the phase delays of the rotor units are offset relative to each other to offset phases of peak amplitudes of the tonal noises generated by different ones of the rotor units from each other (e.g., see FIG. 2D).

Figure 7:
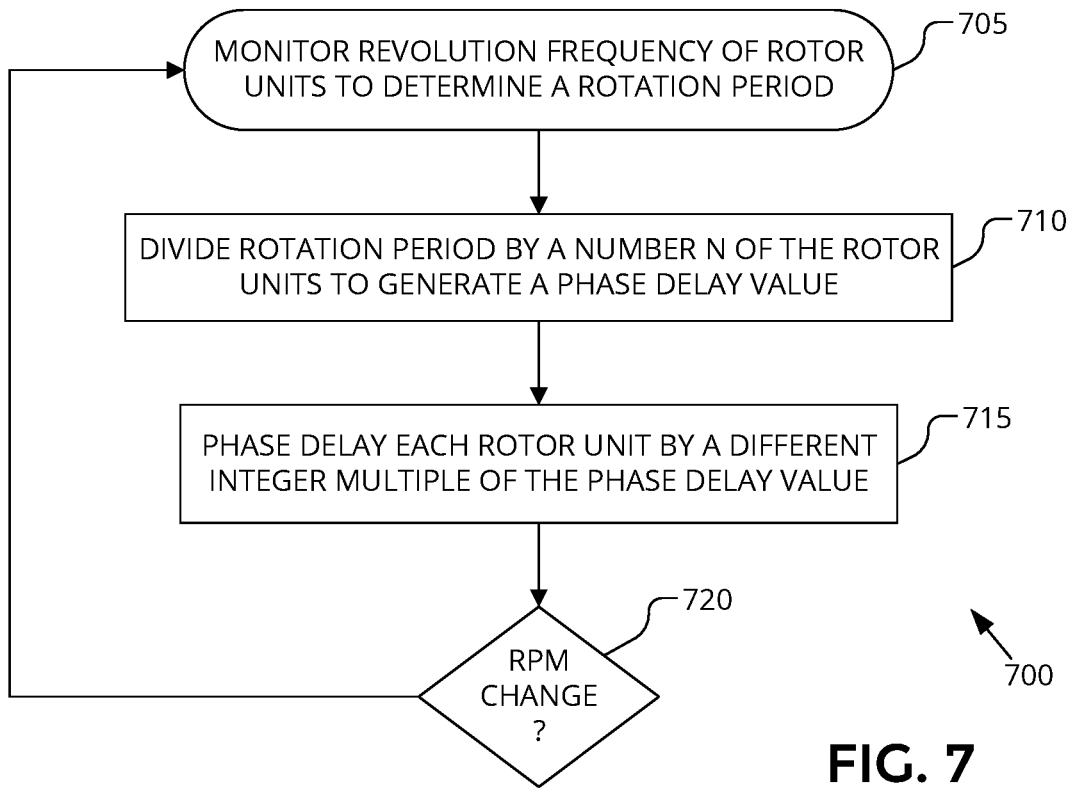
FIG. 7 is a flow chart illustrating a process for phase delaying rotor units of a UAV to spread out tonal noises of the rotor units in time and phase, in accordance with an embodiment of the disclosure.

FIG. 7 is a flow chart illustrating a process 700 for phase delaying rotor units 315 of UAV 1100 to spread out tonal noises in time and phase, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In a process block 705, the revolution frequency of one or more rotor units 315 is monitored to determine a rotation period, which is the inverse of the revolution frequency. In one embodiment, a single rotor unit 315 is selected for monitoring the revolution frequency. In other embodiments, rotor units 315 may be logically grouped and the revolution frequency of a selected member from each group is monitored to determine a group wise revolution frequency. In yet other embodiments, the revolution frequency of all rotor units (or groups of rotor units) may be monitored and averaged to determine a rotation period.

With a rotation period determined, process 700 continues to a process block 710 where the rotation period is divided by a number N to generate a phase delay value (measured in seconds). The number N may represent a total number of all rotor units 315 on UAV 1100 or a number of rotor units 315 that are members of a sub-group. With the phase delay value determined, controller 305 phase delays each rotor unit 315 by a different integer multiple of the phase delay value (process block 715). When the revolution frequency of the monitored rotor unit 315 changes (decision block 720), the rotation period changes and a new phase delay value is recalculated and applied in real-time. By dividing the rotation period of rotor units 315 by the number N of rotor units 315, the phase delays can be evenly distributed in time. Process 700 can be applied to all rotor units 315 of UAV 1100 as a single group, or applied on a sub-group basis as described below.

Figure 8:
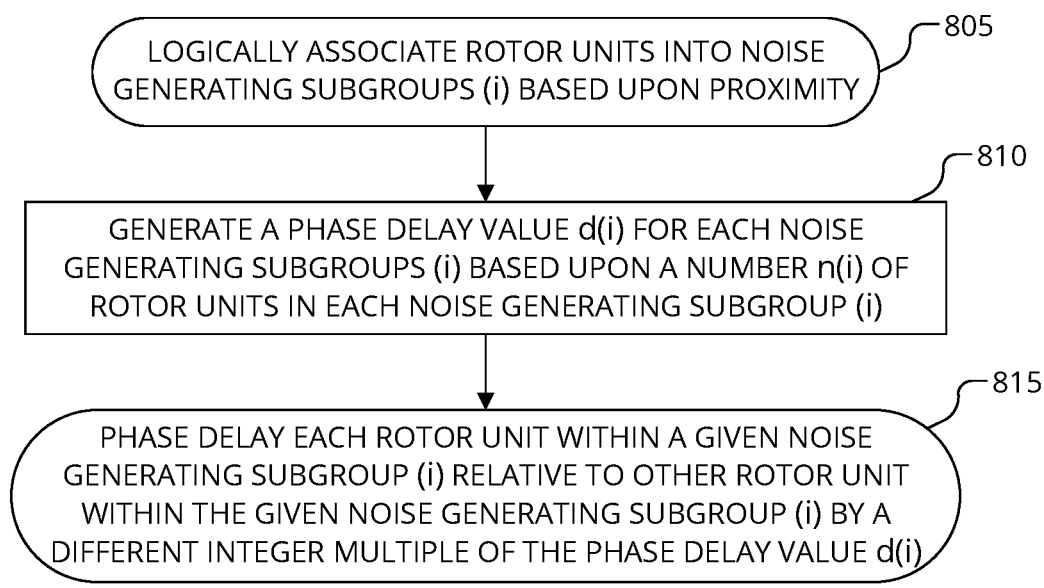
FIG. 8 is a flow chart illustrating a process for phase delaying rotor units of a UAV in groups to spread out tonal noises of the rotor units in time and phase, in accordance with an embodiment of the disclosure.

FIG. 8 is a flow chart illustrating a process 800 for phase delaying rotor units 315 of UAV 1100 in groups to spread out tonal noises in time and phase, in accordance with an embodiment of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

Figure 9:
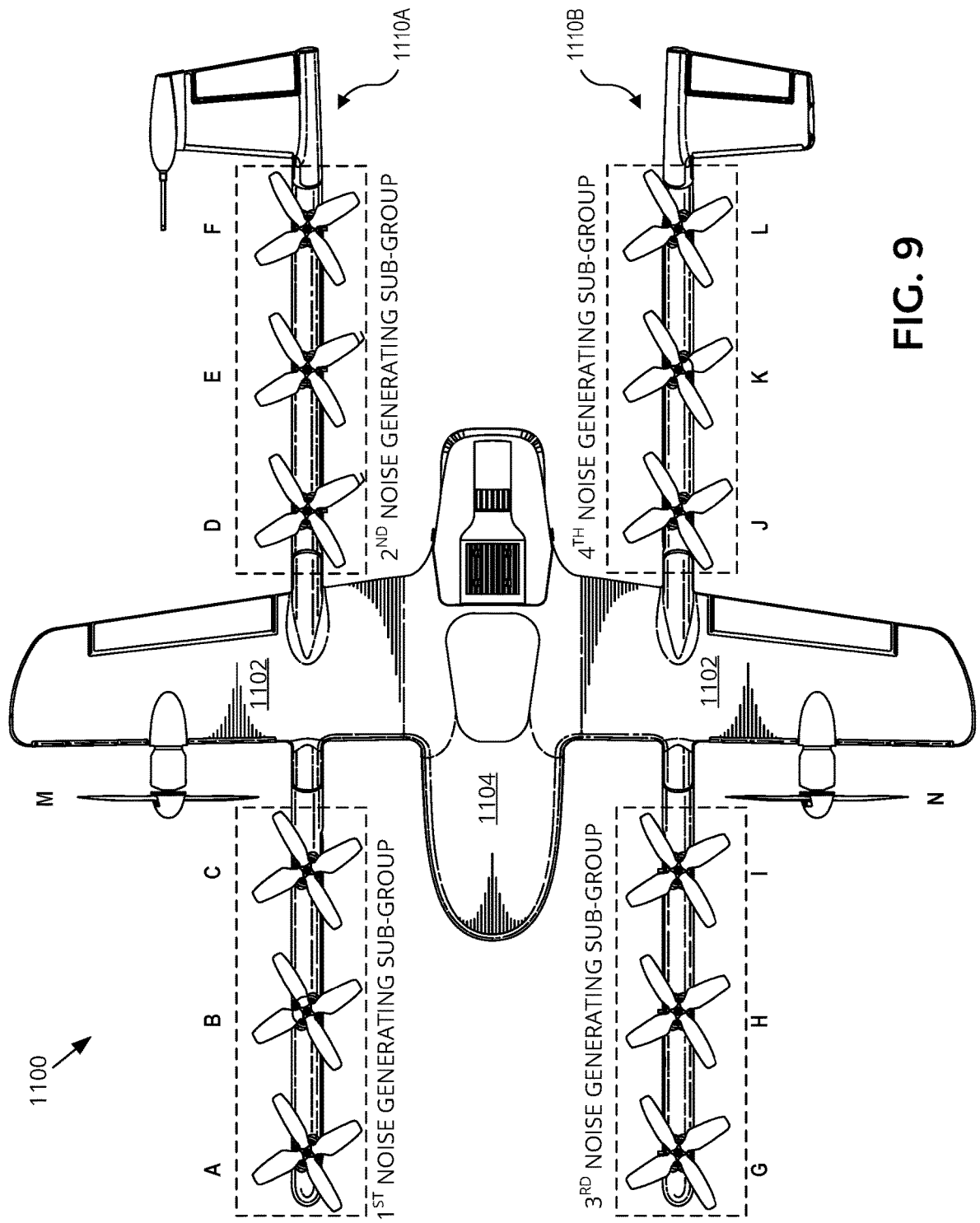
FIG. 9 is a plan view illustration of a UAV depicting how rotor units may be logically associated into noise generating subgroups based upon proximity, in accordance with an embodiment of the disclosure.

In some embodiments, the acoustical wavelengths generated by the rotor units may range between 5 cm to 50 cm. Accordingly, depending upon the overall size of UAV 1100 and how far the rotor units are separated from each other, it may produce improved results to group closely located rotor units into noise generating subgroups. In a process block 805, rotor units of UAV 1100 are logically associated into noise generating subgroups (i) based upon proximity. For example, referring to FIG. 9, rotor units A, B, and C mounted on boom assembly 1110A fore of wing assembly 1102 are logically associated into a first noise generating subgroup (1), rotor units D, E, and F mounted on boom assembly 1110A aft of wing assembly 1102 are logically associated into a second noise generating subgroup (2), rotor units G, H, and I mounted on boom assembly 1110B fore of wing assembly 1102 are logically associated into a third noise generating subgroup (3), and rotor units J, K, and L mounted on boom assembly 1110B aft of wing assembly 1102 are logically associated into a fourth noise generating subgroup (4). Of course, other logical groupings based upon proximity may also be implemented.

In a process block 810, phase delay values d(i) for each noise generating sub-group (I) are generated. Each phase delay value d(i) is calculated by monitoring a revolution frequency for the particular noise generating sub-group (i) and dividing the rotation period by a number n(i) of rotor units within the given noise generating sub-group (i). In the illustrated embodiment, n(i)=3 for each noise generating sub-group (i), which corresponds to a phase delay of a 120 degrees; however, in other embodiments n(i) may vary between different noise generating sub-groups. Finally, Once the phase delay values d(i) are calculated, each rotor unit with a given noise generating subgroup (i) is phase delayed relative to the other rotor units within the given noise generating subgroup (i) by a different integer multiple of the phase delay value d(i) (process block 815).

In addition to adjusting the rotation rates or phase delays of rotor units 315 of UAV 1100 to spread out tonal noises, the rotation rates and/or phase delays may be dynamically modulated to generate chords or even melodies. The generation of chords or melodies can also reduce the perceived nuisance of a UAV. Accordingly, in one embodiment, the rotation rates and/or phase delays are dynamically modulated by controller 305 to generate chords or melodies with the tonal noises emanating from rotor units 315. In one embodiment, controller 305 may be programmed to associate a particular melody (or chord) with a particular flight phase of UAV 1100 and modulate the PWM control signals in a manner that generates that melody (or chord) while UAV 1100 is operating in that flight phase. For example, controller 305 may generate one melody (or chord) during an arrival phase, generate another melody (or chord) during a departure phase, and generate yet another melody (or chord) during a transit phase. Example chords that may be generated by modulating the rotation rates of different rotor units 315 may include one or more of a perfect $5^{th}$, a perfect $6^{th}$, a major $3^{rd}$, a minor $3^{rd}$, a major triad, or otherwise.

Another technique that can increase the perceived desirability of the noise emanating from rotor units of UAV 1100 is to use controller 305 to slightly offset or spread out the rotational frequencies of rotor units 315 from each other to generate a more pleasant sounding beat frequency. This beat frequency is a generated as an interference pattern between the tonal noises generated by multiple rotor units 315. A perceived modulation or acoustical beat could be achieved by having controller 305 shift rotational frequencies of rotor units by approximately 0-25% relative to each other (e.g., relative to their neighbors). In one embodiment, the rotor units 315 may be grouped into quadrants, as illustrated by the noise generating sub-groups in FIG. 9, with the rotor units in each quadrant rotating at the same frequency, but each quadrant group of rotor units having a frequency that slightly deviates from their neighbor quadrant. This slight offset in rotational frequencies can be selected to generate a desirable interference pattern or beat frequency, which may be perceived as a more pleasant sound.

Figure 10:
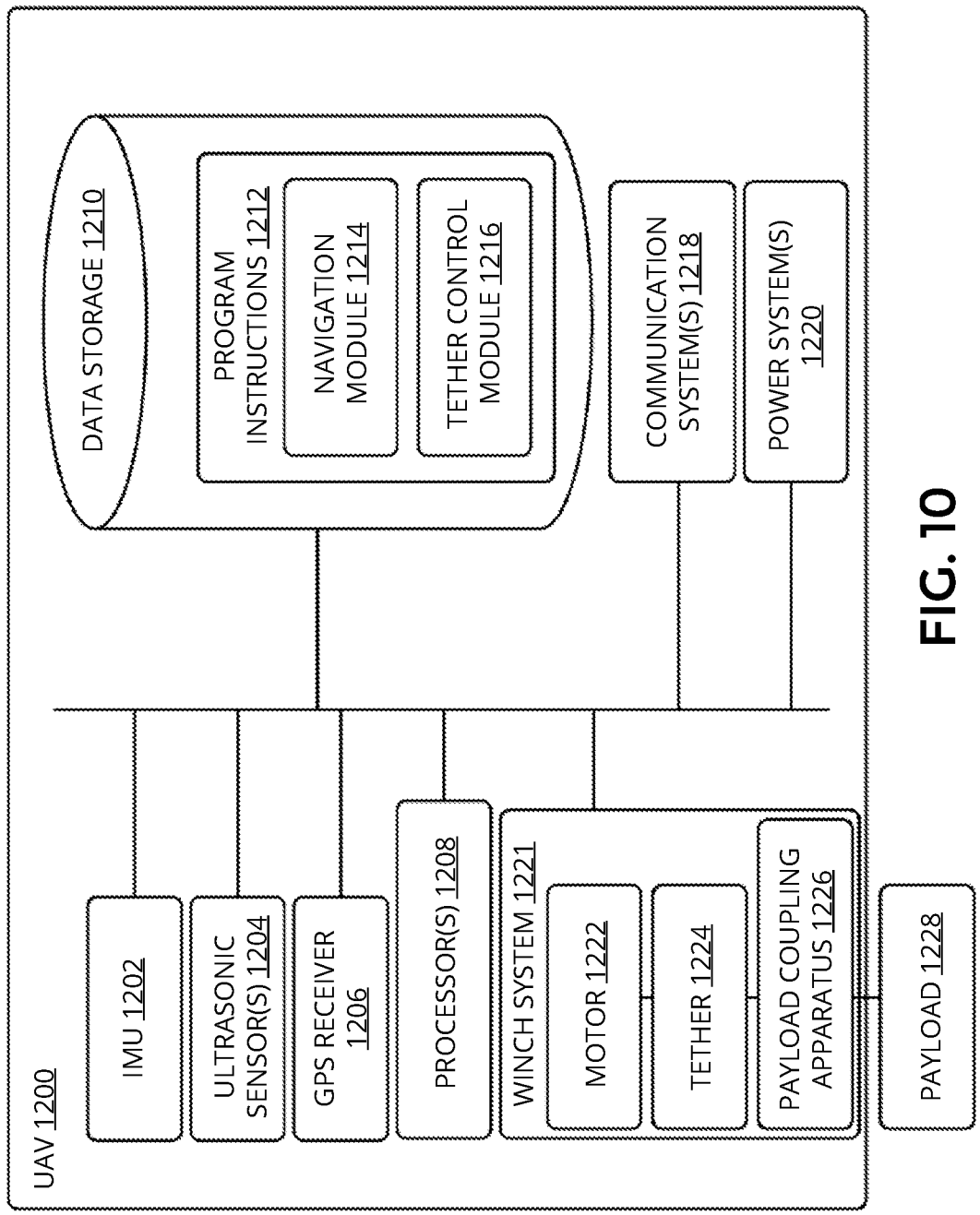
FIG. 10 is a functional block diagram illustrating subsystems of a UAV, in accordance with an embodiment of the disclosure.

FIG. 10 is a functional block diagram illustrating subsystems of a demonstrative UAV 1200, in accordance with an embodiment of the disclosure. UAV 1200 may take the form of UAV 1100 illustrated in FIG. 1. However, UAV 1200 may also take other forms.

UAV 1200 may include various types of sensors, and may include a computing system configured to provide the functionality described herein. In the illustrated embodiment, the sensors of UAV 1200 include an inertial measurement unit (IMU) 1202, ultrasonic sensor(s) 1204, and a GPS 1206, among other possible sensors and sensing systems.

In the illustrated embodiment, UAV 1200 also includes one or more processors 1208. A processor 1208 may be a general-purpose processor or a special purpose processor (e.g., digital signal processors, application specific integrated circuits, etc.). The one or more processors 1208 can be configured to execute computer-readable program instructions 1212 that are stored in the data storage 1210 and are executable to provide the functionality of a UAV described herein.

The data storage 1210 may include or take the form of one or more computer-readable storage media that can be read or accessed by at least one processor 1208. The one or more computer-readable storage media can include volatile and/or non-volatile storage components, such as optical, magnetic, organic or other memory or disc storage, which can be integrated in whole or in part with at least one of the one or more processors 1208. In some embodiments, the data storage 1210 can be implemented using a single physical device (e.g., one optical, magnetic, organic or other memory or disc storage unit), while in other embodiments, the data storage 1210 can be implemented using two or more physical devices.

As noted, the data storage 1210 can include computer-readable program instructions 1212 and perhaps additional data, such as diagnostic data of the UAV 1200. As such, the data storage 1210 may include program instructions 1212 to perform or facilitate some or all of the UAV functionality described herein. For instance, in the illustrated embodiment, program instructions 1212 include a navigation module 1214 and a tether control module 1216.

Sensors

In an illustrative embodiment, IMU 1202 may include both an accelerometer and a gyroscope, which may be used together to determine an orientation of the UAV 1200. In particular, the accelerometer can measure the orientation of the vehicle with respect to earth, while the gyroscope measures the rate of rotation around an axis. IMUs are commercially available in low-cost, low-power packages. For instance, an IMU 1202 may take the form of or include a miniaturized MicroElectroMechanical System (MEMS) or a NanoElectroMechanical System (NEMS). Other types of IMUs may also be utilized.

An IMU 1202 may include other sensors, in addition to accelerometers and gyroscopes, which may help to better determine position and/or help to increase autonomy of the UAV 1200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 1200 may also include a pressure sensor or barometer, which can be used to determine the altitude of the UAV 1200. Alternatively, other sensors, such as sonic altimeters or radar altimeters, can be used to provide an indication of altitude, which may help to improve the accuracy of and/or prevent drift of an IMU.

In a further aspect, UAV 1200 may include one or more sensors that allow the UAV to sense objects in the environment. For instance, in the illustrated embodiment, UAV 1200 includes ultrasonic sensor(s) 1204. Ultrasonic sensor(s) 1204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 1200 may also include one or more imaging system(s). For example, one or more still and/or video cameras may be utilized by UAV 1200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 1200 may also include a GPS receiver 1206. The GPS receiver 1206 may be configured to provide data that is typical of well-known GPS systems, such as the GPS coordinates of the UAV 1200. Such GPS data may be utilized by the UAV 1200 for various functions. As such, the UAV may use its GPS receiver 1206 to help navigate to the caller's location, as indicated, at least in part, by the GPS coordinates provided by their mobile device. Other examples are also possible.

Navigation and Location Determination

The navigation module 1214 may provide functionality that allows the UAV 1200 to, e.g., move about its environment and reach a desired location. To do so, the navigation module 1214 may control the altitude and/or direction of flight by controlling the mechanical features of the UAV that affect flight (e.g., its rudder(s), elevator(s), aileron(s), and/or the speed of its propeller(s)).

In order to navigate the UAV 1200 to a target location, the navigation module 1214 may implement various navigation techniques, such as map-based navigation and localization-based navigation, for instance. With map-based navigation, the UAV 1200 may be provided with a map of its environment, which may then be used to navigate to a particular location on the map. With localization-based navigation, the UAV 1200 may be capable of navigating in an unknown environment using localization. Localization-based navigation may involve the UAV 1200 building its own map of its environment and calculating its position within the map and/or the position of objects in the environment. For example, as a UAV 1200 moves throughout its environment, the UAV 1200 may continuously use localization to update its map of the environment. This continuous mapping process may be referred to as simultaneous localization and mapping (SLAM). Other navigation techniques may also be utilized.

In some embodiments, the navigation module 1214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 1214 may cause UAV 1200 to move from waypoint to waypoint, in order to ultimately travel to a final destination (e.g., a final waypoint in a sequence of waypoints).

In a further aspect, the navigation module 1214 and/or other components and systems of the UAV 1200 may be configured for "localization" to more precisely navigate to the scene of a target location. More specifically, it may be desirable in certain situations for a UAV to be within a threshold distance of the target location where a payload 1228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 1200 may navigate to the general area of a target destination where a payload 1228 is being delivered using waypoints and/or map-based navigation. The UAV may then switch to a mode in which it utilizes a localization process to locate and travel to a more specific location. For instance, if the UAV 1200 is to deliver a payload to a user's home, the UAV 1200 may need to be substantially close to the target location in order to avoid delivery of the payload to undesired areas (e.g., onto a roof, into a pool, onto a neighbor's property, etc.). However, a GPS signal may only get the UAV 1200 so far (e.g., within a block of the user's home). A more precise location-determination technique may then be used to find the specific target location.

Various types of location-determination techniques may be used to accomplish localization of the target delivery location once the UAV 1200 has navigated to the general area of the target delivery location. For instance, the UAV 1200 may be equipped with one or more sensory systems, such as, for example, ultrasonic sensors 1204, infrared sensors (not shown), and/or other sensors, which may provide input that the navigation module 1214 utilizes to navigate autonomously or semi-autonomously to the specific target location.

As another example, once the UAV 1200 reaches the general area of the target delivery location (or of a moving subject such as a person or their mobile device), the UAV 1200 may switch to a "fly-by-wire" mode where it is controlled, at least in part, by a remote operator, who can navigate the UAV 1200 to the specific target location. To this end, sensory data from the UAV 1200 may be sent to the remote operator to assist them in navigating the UAV 1200 to the specific location.

As yet another example, the UAV 1200 may include a module that is able to signal to a passer-by for assistance in either reaching the specific target delivery location; for example, the UAV 1200 may display a visual message requesting such assistance in a graphic display, play an audio message or tone through speakers to indicate the need for such assistance, among other possibilities. Such a visual or audio message might indicate that assistance is needed in delivering the UAV 1200 to a particular person or a particular location, and might provide information to assist the passer-by in delivering the UAV 1200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 1200 arrives at the general area of a target delivery location, the UAV 1200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 1200 may be configured to navigate by "sourcing" such directional signals—in other words, by determining where the signal is strongest and navigating accordingly. As another example, a mobile device can emit a frequency, either in the human range or outside the human range, and the UAV 1200 can listen for that frequency and navigate accordingly. As a related example, if the UAV 1200 is listening for spoken commands, then the UAV 1200 could utilize spoken statements, such as "I'm over here!" to source the specific location of the person requesting delivery of a payload.

In an alternative arrangement, a navigation module may be implemented at a remote computing device, which communicates wirelessly with the UAV 1200. The remote computing device may receive data indicating the operational state of the UAV 1200, sensor data from the UAV 1200 that allows it to assess the environmental conditions being experienced by the UAV 1200, and/or location information for the UAV 1200. Provided with such information, the remote computing device may determine altitudinal and/or directional adjustments that should be made by the UAV 1200 and/or may determine how the UAV 1200 should adjust its mechanical features (e.g., its rudder(s), elevator(s), aileron(s), and/or the speed of its propeller(s)) in order to effectuate such movements. The remote computing system may then communicate such adjustments to the UAV 1200 so it can move in the determined manner.

Communication Systems

In a further aspect, the UAV 1200 includes one or more communication systems 1218. The communications systems 1218 may include one or more wireless interfaces and/or one or more wireline interfaces, which allow the UAV 1200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 1200 may include communication systems 1218 that allow for both short-range communication and long-range communication. For example, the UAV 1200 may be configured for short-range communications using Bluetooth and for long-range communications under a CDMA protocol. In such an embodiment, the UAV 1200 may be configured to function as a "hot spot;" or in other words, as a gateway or proxy between a remote support device and one or more data networks, such as a cellular network and/or the Internet. Configured as such, the UAV 1200 may facilitate data communications that the remote support device would otherwise be unable to perform by itself.

For example, the UAV 1200 may provide a WiFi connection to a remote device, and serve as a proxy or gateway to a cellular service provider's data network, which the UAV might connect to under an LTE or a 3G protocol, for instance. The UAV 1200 could also serve as a proxy or gateway to a high-altitude balloon network, a satellite network, or a combination of these networks, among others, which a remote device might not be able to otherwise access.

Power Systems

In a further aspect, the UAV 1200 may include power system(s) 1220. The power system 1220 may include one or more batteries for providing power to the UAV 1200. In one example, the one or more batteries may be rechargeable and each battery may be recharged via a wired connection between the battery and a power supply and/or via a wireless charging system, such as an inductive charging system that applies an external time-varying magnetic field to an internal battery.

Payload Delivery

The UAV 1200 may employ various systems and configurations in order to transport and deliver a payload 1228. In some implementations, the payload 1228 of a given UAV 1200 may include or take the form of a "package" designed to transport various goods to a target delivery location. For example, the UAV 1200 can include a compartment, in which an item or items may be transported. Such a package may one or more food items, purchased goods, medical items, or any other object(s) having a size and weight suitable to be transported between two locations by the UAV. In other embodiments, a payload 1228 may simply be the one or more items that are being delivered (e.g., without any package housing the items).

In some embodiments, the payload 1228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 1228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 1221 controlled by the tether control module 1216 in order to lower the payload 1228 to the ground while the UAV hovers above. As shown in FIG. 12, the winch system 1221 may include a tether 1224, and the tether 1224 may be coupled to the payload 1228 by a payload coupling apparatus 1226. The tether 1224 may be wound on a spool that is coupled to a motor 1222 of the UAV. The motor 1222 may take the form of a DC motor (e.g., a servo motor) that can be actively controlled by a speed controller. The tether control module 1216 can control the speed controller to cause the motor 1222 to rotate the spool, thereby unwinding or retracting the tether 1224 and lowering or raising the payload coupling apparatus 1226. In practice, the speed controller may output a desired operating rate (e.g., a desired RPM) for the spool, which may correspond to the speed at which the tether 1224 and payload 1228 should be lowered towards the ground. The motor 1222 may then rotate the spool so that it maintains the desired operating rate.

In order to control the motor 1222 via the speed controller, the tether control module 1216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 1222 causes rotation of the spool, a rotary encoder may be used to measure this rotation. In doing so, the rotary encoder may be used to convert a rotary position to an analog or digital electronic signal used by the tether control module 1216 to determine the amount of rotation of the spool from a fixed reference angle and/or to an analog or digital electronic signal that is representative of a new rotary position, among other options. Other examples are also possible.

Based on the data from the speed sensor, the tether control module 1216 may determine a rotational speed of the motor 1222 and/or the spool and responsively control the motor 1222 (e.g., by increasing or decreasing an electrical current supplied to the motor 1222) to cause the rotational speed of the motor 1222 to match a desired speed. When adjusting the motor current, the magnitude of the current adjustment may be based on a proportional-integral-derivative (PID) calculation using the determined and desired speeds of the motor 1222. For instance, the magnitude of the current adjustment may be based on a present difference, a past difference (based on accumulated error over time), and a future difference (based on current rates of change) between the determined and desired speeds of the spool.

In some embodiments, the tether control module 1216 may vary the rate at which the tether 1224 and payload 1228 are lowered to the ground. For example, the speed controller may change the desired operating rate according to a variable deployment-rate profile and/or in response to other factors in order to change the rate at which the payload 1228 descends toward the ground. To do so, the tether control module 1216 may adjust an amount of braking or an amount of friction that is applied to the tether 1224. For example, to vary the tether deployment rate, the UAV 1200 may include friction pads that can apply a variable amount of pressure to the tether 1224. As another example, the UAV 1200 can include a motorized braking system that varies the rate at which the spool lets out the tether 1224. Such a braking system may take the form of an electromechanical system in which the motor 1222 operates to slow the rate at which the spool lets out the tether 1224. Further, the motor 1222 may vary the amount by which it adjusts the speed (e.g., the RPM) of the spool, and thus may vary the deployment rate of the tether 1224. Other examples are also possible.

In some embodiments, the tether control module 1216 may be configured to limit the motor current supplied to the motor 1222 to a maximum value. With such a limit placed on the motor current, there may be situations where the motor 1222 cannot operate at the desired operate specified by the speed controller. For instance, as discussed in more detail below, there may be situations where the speed controller specifies a desired operating rate at which the motor 1222 should retract the tether 1224 toward the UAV 1200, but the motor current may be limited such that a large enough downward force on the tether 1224 would counteract the retracting force of the motor 1222 and cause the tether 1224 to unwind instead. And as further discussed below, a limit on the motor current may be imposed and/or altered depending on an operational state of the UAV 1200.

In some embodiments, the tether control module 1216 may be configured to determine a status of the tether 1224 and/or the payload 1228 based on the amount of current supplied to the motor 1222. For instance, if a downward force is applied to the tether 1224 (e.g., if the payload 1228 is attached to the tether 1224 or if the tether 1224 gets snagged on an object when retracting toward the UAV 1200), the tether control module 1216 may need to increase the motor current in order to cause the determined rotational speed of the motor 1222 and/or spool to match the desired speed. Similarly, when the downward force is removed from the tether 1224 (e.g., upon delivery of the payload 1228 or removal of a tether snag), the tether control module 1216 may need to decrease the motor current in order to cause the determined rotational speed of the motor 1222 and/or spool to match the desired speed. As such, the tether control module 1216 may, based on the current supplied to the motor 1222, determine if the payload 1228 is attached to the tether 1224, if someone or something is pulling on the tether 1224, and/or if the payload coupling apparatus 1226 is pressing against the UAV 1200 after retracting the tether 1224. Other examples are possible as well.

During delivery of the payload 1228, the payload coupling apparatus 1226 can be configured to secure the payload 1228 while being lowered from the UAV by the tether 1224, and can be further configured to release the payload 1228 upon reaching ground level. The payload coupling apparatus 1226 can then be retracted to the UAV by reeling in the tether 1224 using the motor 1222.

In some implementations, the payload 1228 may be passively released once it is lowered to the ground. For example, a passive release mechanism may include one or more swing arms adapted to retract into and extend from a housing. An extended swing arm may form a hook on which the payload 1228 may be attached. Upon lowering the release mechanism and the payload 1228 to the ground via a tether, a gravitational force as well as a downward inertial force on the release mechanism may cause the payload 1228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 1228 no longer forces the swing arm to extend from the housing. Retracting the swing arm into the housing may reduce the likelihood of the release mechanism snagging the payload 1228 or other nearby objects when raising the release mechanism toward the UAV upon delivery of the payload 1228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 1200 could include an air-bag drop system or a parachute drop system. Alternatively, a UAV 1200 carrying a payload could simply land on the ground at a delivery location. Other examples are also possible.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV), comprising:
a UAV body;
a plurality of rotor units mounted to the UAV body, each of the rotor units including a bladed rotor that rotates to generate thrust; and
a control system coupled to each of the rotor units to control rotation of the bladed rotor of each of the rotor units, wherein the control system includes a controller with logic that, when executed by the controller, will cause the UAV to perform operations including:
adjusting at least one of a rotation rate or a phase delay of at least one of the rotor units relative to another of the rotor units, wherein adjusting the at least one of the rotation rate or the phase delay causes a spread in tonal noises generated by the rotor units,
wherein adjusting at least one of the rotation rate or the phase delay comprises offsetting phase delays of the rotor units relative to each other to offset phases of peak amplitudes of the tonal noises generated by different ones of the rotor units from each other,
wherein offsetting the phase delays of the rotor units relative to each other comprises:
determining a revolution frequency for one or more of the rotor units to determine a rotation period for the one or more of the rotor units;
dividing the rotation period by a number N of the rotor units to generate a phase delay value; and
phase delaying each of the number N of the rotor units by a different integer multiple of the phase delay value.

2. The UAV of claim 1, wherein the number N comprises a total number of the rotor units mounted to the UAV body.

3. The UAV of claim 1, wherein offsetting the phase delays of the rotor units relative to each other further comprises:
grouping the plurality of rotor units into noise generating subgroups (i) based upon proximity of the rotor units to each other;
generating a phase delay value D(i) for each of the noise generating subgroups (i) based upon a number N(i) of the rotors in each of the noise generating subgroups (i); and
phase delaying each of the rotor units within a given one of the noise generating subgroups (i) relative to other ones of the rotor units within the given one of the noise generating subgroups (i) by a different integer multiple of the phase delay value D(i).

4. The UAV of claim 3, wherein the UAV body includes a wing assembly and first and second boom assemblies mounted to the wing assembly and wherein the rotor units are mounted to the first and second boom assemblies, wherein the rotor units mounted to the first boom assembly fore of the wing assembly comprise a first one of the noise generating subgroups (i), the rotor units mounted to the first boom assembly aft of the wing assembly comprise a second one of the noise generating subgroups (i), the rotor units mounted to the second boom assembly fore of the wing assembly comprise a third one of the noise generating subgroups (i), and the rotor units mounted to the second boom assembly aft of the wing assembly comprise a fourth one of the noise generating subgroups (i).

5. The UAV of claim 1, wherein offsetting the phase delays of the rotor units relative to each other further comprises:
updating the phase delay value in real-time based upon changes in the revolution frequency of the one or more of the rotor units.

6. The UAV of claim 1, wherein determining the revolution frequency for the one or more of the rotor units comprises monitoring one or both of a voltage or a current driving the one or more of the rotor units in real-time and wherein phase delaying each of the rotor units comprises adjusting a pulse width modulation of each of the rotor units in real-time.

7. The UAV of claim 1, wherein adjusting at least one of the rotation rate or the phase delay comprises varying rotation rates of the rotor units relative to each other to spectrally spread out component frequencies of the tonal noises collectively generated by the rotor units.

8. The UAV of claim 7, wherein one or more of the rotor units have different physical geometries relative to each other such that different rotation rates for different ones of the rotor units produce a common amount of thrust.

9. The UAV of claim 8, wherein the different physical geometries includes differences in one or more of a diameter of the bladed rotor, a surface area of the bladed rotor, a pitch of the bladed rotor, or a number of blades on the bladed rotor.

10. The UAV of claim 7, wherein varying the rotation rates of the rotor units relative to each other comprises varying the rotation rates in groups of the rotor units to spectrally spread out the component frequencies of the tonal noises while maintaining flight stability.

11. The UAV of claim 7, wherein varying the rotation rates of the rotor units relative to each other to spectrally spread out the component frequencies of the tonal noises comprises introducing a gyroscopic wobble about a stabilized center of the UAV by dynamically modulating the rotation rates of different ones of the rotor units.

12. The UAV of claim 1, wherein the controller includes further logic that, when executed by the controller, will cause the UAV to perform additional operations including:
dynamically modulating the rotation rates of the rotor units to generate a melody with the tonal noises generated by the rotor units, wherein the melody comprises arranging the tonal noises to an acoustical beat;
associating the melody with a particular flight phase;
generating the melody with the rotor units while the UAV is operating in the particular flight phase; and
producing different melodies for different flight phases.

13. The UAV of claim 12, wherein the particular flight phase comprises one of an arrival phase, a departure phase, or a transit phase.

14. The UAV of claim 1, further comprising:
generating chords with the tonal noises by varying the rotation rates between the rotor units.

15. A method of controlling tonal noises produced by an unmanned aerial vehicle (UAV), the method comprising:
generating thrust with a plurality of rotor units mounted to the UAV to propel the UAV into flight, each of the rotor units including a bladed rotor; and
adjusting at least one of a rotation rate or a phase delay of at least one of the rotor units relative to one or more others of the rotor units, wherein adjusting the at least one of the rotation rate or the phase delay causes a spread in the tonal noises generated by the rotor units, wherein adjusting at least one of the rotation rate or the phase delay comprises varying rotation rates of the rotor units relative to each other to spectrally spread out component frequencies of the tonal noises collectively generated by the rotor units,
wherein one or more of the rotor units have different physical geometries relative to each other such that different rotation rates for different ones of the rotor units produce a common amount of thrust.

16. The method of claim 15, wherein adjusting at least one of the rotation rate or the phase delay comprises offsetting phase delays of the rotor units relative to each other to offset phases of peak amplitudes of the tonal noises generated by different ones of the rotor units from each other.

17. The method of claim 16, wherein offsetting the phase delays of the rotor units relative to each other comprises:
determining a revolution frequency for one or more of the rotor units to determine a rotation period for the one or more of the rotor units;
dividing the rotation period by a number N of the rotor units to generate a phase delay value; and
phase delaying each of the number N of the rotor units by a different integer multiple of the phase delay value.

18. The method of claim 17, wherein offsetting the phase delays of the rotor units relative to each other further comprises:
grouping the plurality of rotor units into noise generating subgroups (i) based upon proximity of the rotor units to each other;
generating a phase delay value D(i) for each of the noise generating subgroups (i) based upon a number N(i) of the rotors in each of the noise generating subgroups (i); and
phase delaying each of the rotor units within a given one of the noise generating subgroups (i) relative to other ones of the rotor units within the given one of the noise generating subgroups (i) by a different integer multiple of the phase delay value D(i).

19. The method of claim 17, wherein offsetting the phase delays of the rotor units relative to each other further comprises:
updating the phase delay value in real-time based upon changes in the revolution frequency of the one or more of the rotor units.

20. The method of claim 15, wherein varying the rotation rates of the rotor units relative to each other comprises varying the rotation rates in groups of the rotor units to spectrally spread out the component frequencies of the tonal noises while maintain flight stability.

21. The method of claim 15, wherein varying the rotation rates of the rotor units relative to each other comprises varying the rotation rates of the rotor units relative to each other to generate an interference pattern perceived as an acoustical beat.

22. The method of claim 15, further comprising:
dynamically modulating the rotation rates of the rotor units to generate a melody with the tonal noises generated by the rotor units, wherein the melody comprises arranging the tonal noises to an acoustical beat;
associating the melody with a particular flight phase;
generating the melody with the rotor units while the UAV is operating in the particular flight phase; and
producing different melodies for different flight phases.

23. A method of controlling tonal noises produced by an unmanned aerial vehicle (UAV), the method comprising:
generating thrust with a plurality of rotor units mounted to the UAV to propel the UAV into flight, each of the rotor units including a bladed rotor;
adjusting at least one of a rotation rate or a phase delay of at least one of the rotor units relative to one or more others of the rotor units, wherein adjusting the at least one of the rotation rate or the phase delay causes a spread in the tonal noises generated by the rotor units; and
generating chords with the tonal noises by varying the rotation rates between the rotor units.

24. An unmanned aerial vehicle (UAV), comprising:
a UAV body;
a plurality of rotor units mounted to the UAV body, each of the rotor units including a bladed rotor that rotates to generate thrust; and
a control system coupled to each of the rotor units to control rotation of the bladed rotor of each of the rotor units, wherein the control system includes a controller with logic that, when executed by the controller, will cause the UAV to perform operations including:
adjusting at least one of a rotation rate or a phase delay of at least one of the rotor units relative to another of the rotor units, wherein adjusting the at least one of the rotation rate or the phase delay causes a spread in tonal noises generated by the rotor units,
wherein adjusting at least one of the rotation rate or the phase delay comprises varying rotation rates of the rotor units relative to each other to spectrally spread out component frequencies of the tonal noises collectively generated by the rotor units by dynamically modulating the rotation rates of different ones of the rotor units and introducing a gyroscopic wobble about a stabilized center of the UAV.

* * * * *